June 26, 1962 P. M. J. BODEZ 3,041,538

CODED RADIO-PULSE TRANSMITTER

Filed Dec. 19, 1960 4 Sheets-Sheet 1

June 26, 1962 P. M. J. BODEZ 3,041,538

CODED RADIO-PULSE TRANSMITTER

Filed Dec. 19, 1960 4 Sheets-Sheet 3

United States Patent Office 3,041,538
Patented June 26, 1962

3,041,538

CODED RADIO-PULSE TRANSMITTER

Pierre Marcel Jean Bodez, Paris, France, assignor to Precision Mecanique Labinal Filed Dec. 19, 1960, Ser. No. 76,705
Claims priority, application France Dec. 22, 1959
5 Claims. (Cl. 325—38)

In French Patent 1,221,755 entitled "Improvements to Coded-Pulse Receivers" and in my U.S. patent application Serial Number 37,663 filed on June 21, 1960, now Patent No. 3,009,058, issued November 14, 1961 there are described receivers wherein the emission to be received is in the form of a train of pulses, each basic signal being constituted by at least two pulses separated by a constant time interval, thereby forming a preset code, and each train of pulses comprising at least three basic signals of which the first is a synchronization signal while the other two are channel signals to be dispatched in predetermined directions after being received, each such channel signal being separated from the synchronization signal by fixed time intervals which key each of the channels. Naturally, on transmission, the pulses constitute the modulation envelope for a carrier wave whose frequency is high in relation to the reciprocal of the pulse duration.

This invention relates to a transmitting device capable of generating such coded signals.

In accordance with the invention, utilization is made, in a transmitter of this type, of an auxiliary sinusoidal oscillation so as to generate pulses with fixed delays relative to reference pulses.

To this end, the transmitter firstly comprises a reference-pulse-generating line feeding a sinusoidal generator, followed by a phase-shifter, the latter in turn feeding two counting circuits in parallel.

Each of these counting circuits feeds a modulator which further receives a modulating current modified by a command.

The reference pulses are superimposed in a mixer together with the currents emerging from the command modulators, and the pulses emerging from said mixer are applied to a coding line comprising a direct input to a coding mixer and two indirect inputs after passage through precalibrated delay lines.

The output mixer from the coding line furnishes pulses, after suitable amplification, to the modulator of a transmitter.

Likewise in accordance with the invention, each of the oscillations or pulses generated at the various stages of the transmitter is regenerated before it is applied to the subsequent stage.

In a preferred embodiment of the coding line, this regeneration of the coded signals is performed, in order to permit a predetermined length to be assigned to them with great accuracy, through the medium of regeneration stages wherein output transformers are provided with a tertiary winding which is exclusively connected to delay lines of the reflex or to-and-fro type, and these tertiary windings induce blocking by an apparent shorting of said transformers after a time lapse equal to twice the inherent delay of said lines.

Each basic signal has thereby assigned to it a precise spacing relative to those which envelop it, as well as a virtually constant length which imparts to the transmission the desired coding stability.

The description which follows with reference to the accompanying drawings, given by way of example and not in a limiting sense, will give a clear understanding of how the invention may be performed.

Referring now to the drawings, FIG. 1 is a block diagram of the manner of interconnection of the various assemblies constituting the transmitter as a whole.

Figure 1:
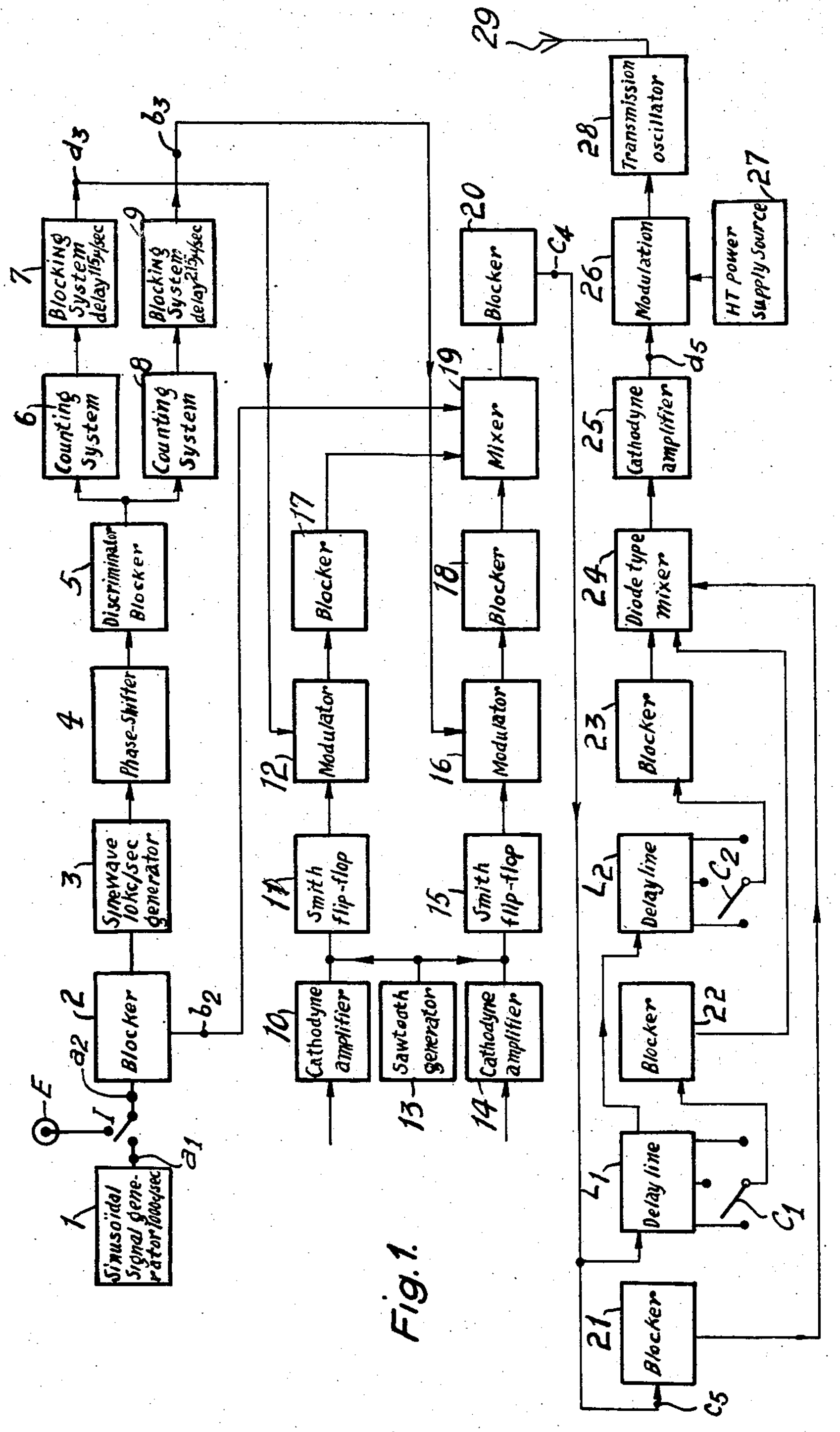

The arrangement shown in FIG. 1 comprises a generator 1 generating a sinusoidal oscillation transformed into square signals at 1000 c.p.s., the said generator being connected via a switch I to an assembly 2 known as a "blocker," designed to shape the pulses. The blocker 2 is connected to a sine wave generator 3 producing an oscillation having a frequency of 10 kc./s. When in another position, the switch I can be connected to an external source of oscillations E. The generator 3 is connected to a phase-shifter 4 which introduces a delay of 15 $\mu$s. and this phase-shifter is itself connected to a discriminator-blocker 5.

The device 5 feeds in parallel two assemblies consisting of a counting system 6 feeding into a blocking system 7 which introduces a delay of 115 $\mu$s. and a similar assembly consisting of a counting system 8 feeding into a blocker 9 which introduces a delay of 215 $\mu$s.

The commands to be transmitted by the transmitter are received via at least two command channels, the first of which receives the electrical interpretation of the command in question in a cathodyne-type amplifier 10. The output from this amplifier 10 has applied to it the sawtooth pulses emerging from a generator 13 which feeds, in addition to the amplifier 10, a Smith type flip-flop 11. Flip-flop 11 feeds a modulator 12 to which are also applied the pulses emerging from delay blocker 7. The modulator in turn feeds into a blocker 17.

Further commands are interpreted electrically and these interpreted signals are applied to an amplifier 14 similar to amplifier 10, to whose output is also applied the sawtooth pulses emerging from generator 13 for joint feeding into a further Smith type flip-flop 15. Flip-flop 15 feeds a modulator 16 to which are also applied the pulses emerging from the delaying blocker 9. Modulator 16 feeds into a blocker 18.

The pulses emerging from blocker 2, those from blocker 17 and those from blocker 18 are mixed in a diode-type mixer 19 from which the outgoing pulses are applied to a blocker 20.

The pulses emerging from the blocker 20 are applied to a blocker 21 and also to a delay line L1. The delay line L1 feeds directly into a further delay line L2 and, via its selector switch C1, into a blocker 22. The delay line L2 feeds a blocker 23 via its switch C2. The pulses emerging directly from blocker 21, from blocker 22 and from blocker 23 are combined in a diode-type mixer 24 which feeds a cathodyne-type amplifier 25. This amplifier 25 feeds a modulator 26 which receives the necessary currents from an extremely-high-tension power supply 27 and the modulator 26 feeds a transmission oscillator 28 connected to an antenna 29.

Figure 2:
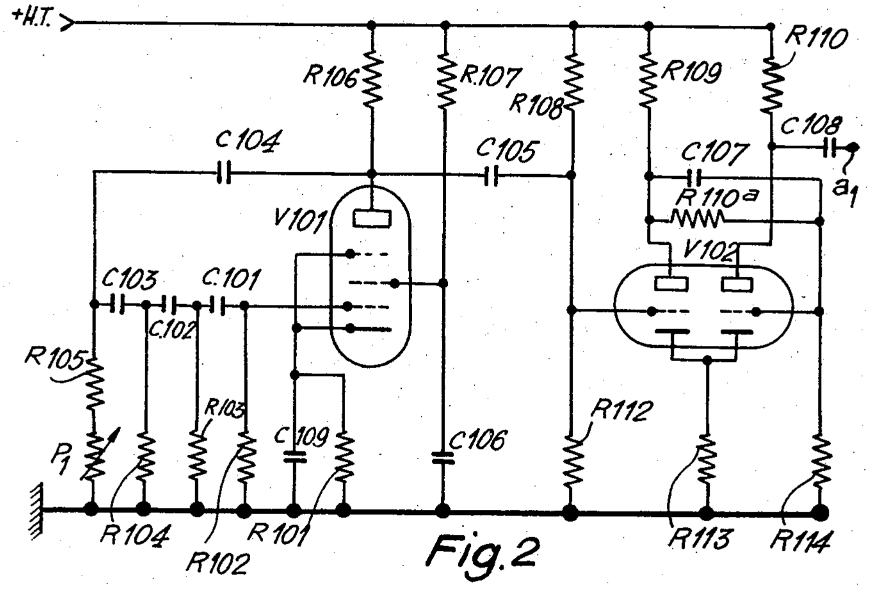
FIG. 2 is a more detailed illustration of the wiring system used for the reference circuit.

As may be seen in greater detail from FIG. 2, the 1000 c.p.s. sine wave generator comprises a tube V101 whose cathode is earthed via a resistor R101 mounted in parallel on a capacitor C109, and the said cathode is connected to the third grid of said tube. The first grid of this tube is earthed through the medium of a set of resistors R102, R103, R104 and R105 connected in parallel, resistor R105 being series-connected to a potentiometer P1. Capacitors C101, C102 and C103 are inserted across the inputs of resistors R102 and R103, R103 and R104, and R104 and R105 respectively. The second grid of tube V101 is connected via a resistor R107 to the high tension (HT) supply and earthed via a capacitor C106. The plate of tube V101 is connected to the HT supply via a resistor R106 and to the input of resistor R105 via a capacitor C104. The said plate is also connected via a capacitor C105 to a resistor bridge R108 and R112, across which is connected the grid of the first element of a double-triode V102. The plate of this first element of double-triode V102 is connected to the HT supply via a resistor R109. It is further connected via a capacitor C107 to the grid of the second element of the said double-triode, which grid is itself earthed via a resistor R114. The plate of the first element of double-triode V102 is connected via a resistor R110*a* to the grid of the second element.

The two cathodes of the two elements of double-triode V102 are earthed via a resistor R113. The plate of the second element of double-triode V102 is connected to the HT supply via a resistor R110, and this plate is further connected to a coupling capacitor C108 terminating at an output terminal *a*1.

The wiring arrangement described hereinabove is that used for element 1 of FIG. 1.

Figure 3:
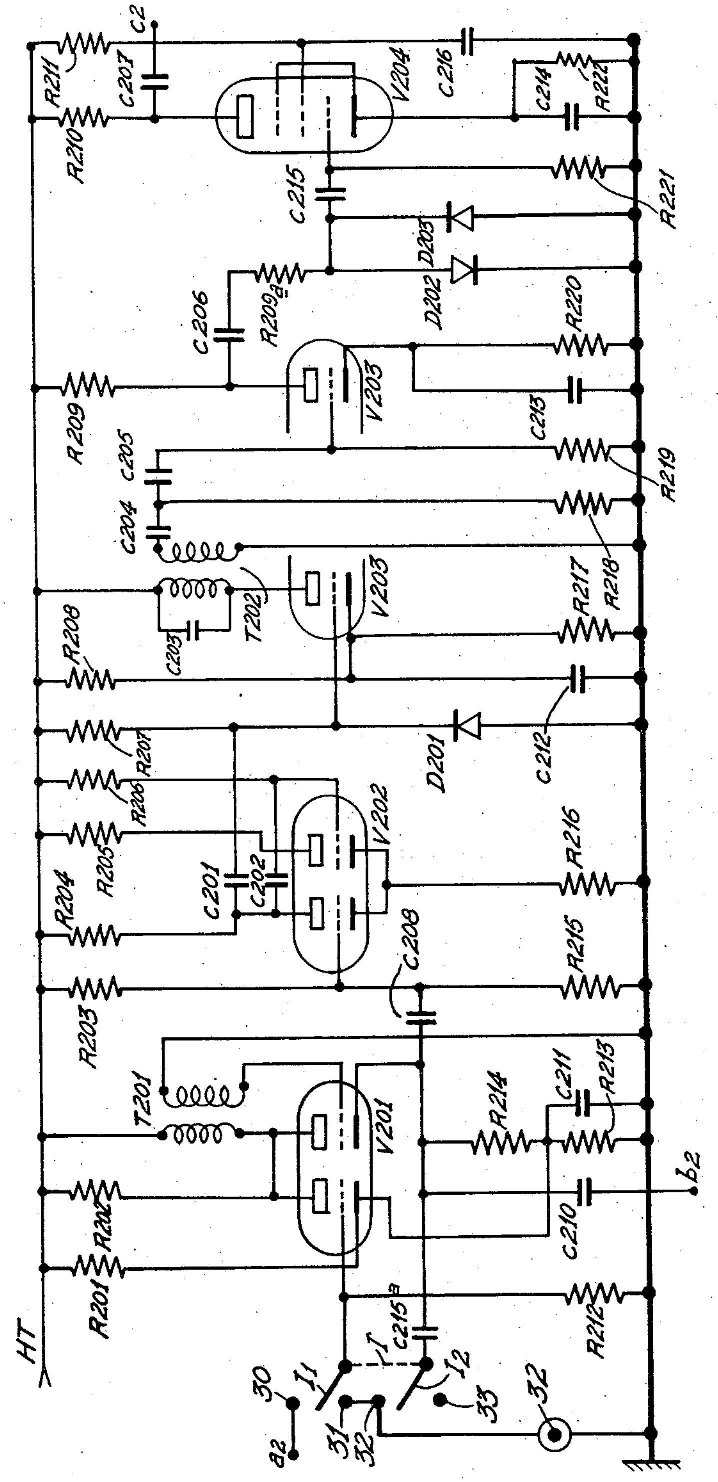
FIG. 3 is a more detailed illustration of the manner of wiring the circuits which shape the pulses fed to the counters.

The terminal *a*1 is connected to the terminal *a*2 which is apparent in FIG. 3, and this terminal is connected to a contact 30 of the switch I whose arm I1 is capable of coming into contact with contact 30 or with a contact 31 connected to a gating device 32 which is itself earthed. The arm I2 of this switch is capable of application either against a contact 32*a* connected to contact 31 or against an insulated contact 33. When in the operative position, arm I1 connects contact 30 with the grid of a tube V201.

This tube V201 is a double-triode and the grid connected to arm I1 is that of its first element, and this grid is earthed via a resistor R212.

The cathode of this first element is connected to the HT supply via a resistor R201 and is earthed via a resistor R213 to which a capacitor C211 is connected in parallel. The plate of this first element is connected to the HT supply via a resistor R202 and is directly connected to the plate of the second element of tube V201.

In the second element of this double-triode, the cathode is connected to switch arm I2 via a capacitor C215*a* and to the input of resistor R213 via a resistor R214. The grid of the second element of tube V201 is earthed via the primary winding of a transformer T201 and its plate is connected to the HT supply via the secondary winding of the said transformer T201. A conductor is connected across the input of resistor R214 and that of capacitor C215*a*, and into this conductor is inserted capacitor C210 ahead of a terminal *b*2.

The cathode of the second element of tube V201 is connected, via a capacitor C208, to the grid of the first element of a double-triode V202, and this grid is in turn connected to the HT supply via a resistor R203 and is earthed via a resistor R215. The two cathodes of this tube V202 are connected in parallel and earthed via a resistor R216. The plate of the first element of tube V202 is connected to the HT supply via a resistor R204 and to the grid of the second element of tube V202 via a capacitor C202. This plate is connected, via a capacitor C201, across a resistor R207 connected to the HT supply and an earthed diode D201. The plate of the second element of tube V202 is connected to the HT supply via a resistor R205, and the grid of this second element is connected to the HT supply via a resistor R206.

Across resistor R207 and diode D201 is connected the first grid of a double-triode V203, and the cathode of this first element of triode V203 is earthed via a resistor R217 to which is parallel-connected a capacitor C212, and said cathode is further connected to the HT supply via a resistor R208. The plate of the first element of said triode V203 is connected to the HT supply via the secondary winding of a transformer T202 to which is parallel-connected a capacitor C203.

The primary winding of said transformer T202 is earthed via one of its extremities, the other extremity being joined to a capacitor C204 which is connected to an earthed resistor R218 and to a capacitor C205 connected to the grid of the second element of said triode V203. This grid is earthed via a resistor R219.

The cathode of this second element of tube V203 is earthed via a resistor R220 and capacitor C213 connected in parallel. The plate of this element of tube V203 is connected to the HT supply via a resistor R209 and to a capacitor C206 placed in series with a resistor R209*a*. The output of resistor R209*a* is earthed via two diodes D202 and D203 having opposite directions of conduction.

Resistor R209*a* is connected via a capacitor C215 to the first grid of a tube V204, and this first grid is earthed via a resistor R221.

The cathode of tube V204 is earthed via a resistor R222 and capacitor C214 connected in parallel, and this cathode is connected to the third grid of said tube V204. The second grid of this tube is earthed via a capacitor C216 and connected to the HT supply via a resistor R211.

The plate of tube V204 is connected to the HT supply via a resistor R210, and is likewise connected to a capacitor C207 terminating at a terminal *c*2.

Figure 4:
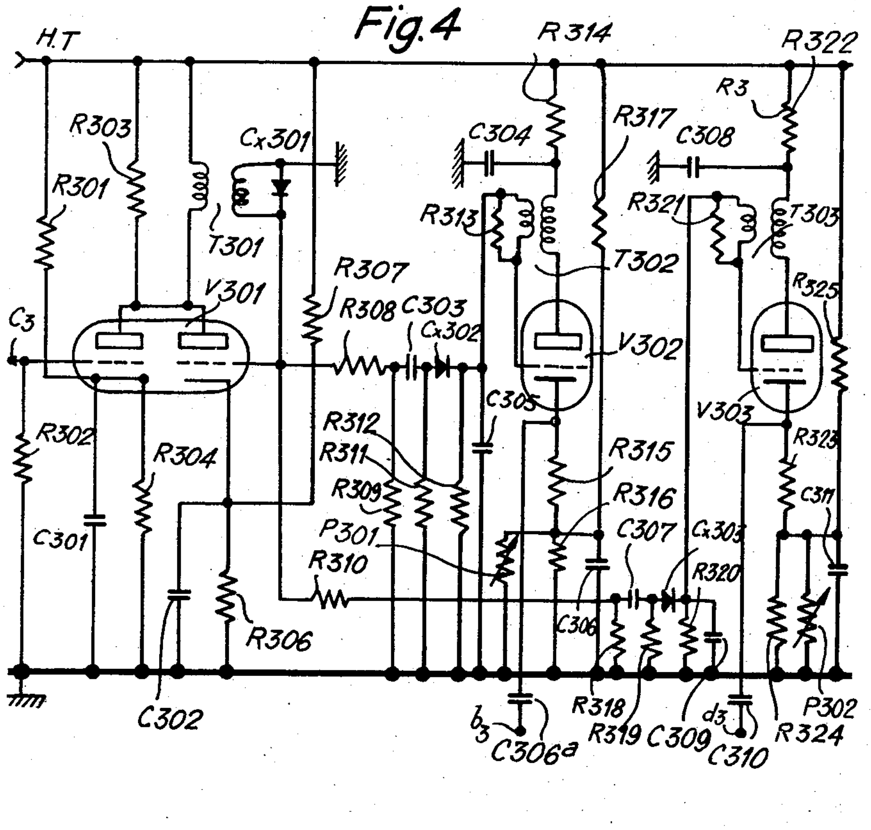
FIG. 4 shows the wiring of the counting circuits and pulse-shaping circuits.

As may be seen from FIG. 4, the first grid of a double-triode V301 is connected to a terminal *c*3 which is in turn connected to terminal *b*2 and which is earthed via a resistor R302. The cathode of this first element of tube V301 is connected to the HT supply via a resistor R301 and is earthed via a resistor R304 and capacitor C301 connected in parallel. The two plates of tube V301 are connected to the HT supply via a resistor R303 and the secondary winding of a transformer T301 respectively, said resistor and said winding being connected in parallel. The cathode of the second element is earthed via a resistor R306 and a capacitor C302 connected in parallel and is connected to the HT supply via a resistor R307. The grid of this second element of tube V301 is earthed via the primary winding of transformer T301, and this primary winding is bridged across by a crystal C*x*301. This grid is further connected via a resistor R308 to the input of a resistor R309 whose output is earthed. The input of this resistor is connected to a capacitor C303 which is in turn connected to the input of a resistor R311 whose output is also earthed. The input of resistor R311 is connected to a crystal C*x*302 connected to the input of a resistor R312 which is earthed via its output. The input of resistor R312 is connected to the primary winding of a transformer T302, and this primary winding is bridged across via a resistor R313 and is connected to the grid of a tube V302. The cathode of tube V302 is connected to the input of a resistor R315 whose output is connected to an earthed resistor R316, to an earthed potentiometer P301, to an earthed capacitor C301 and to a resistor R317 connected to the HT supply.

The plate of tube V302 is connected to the secondary winding of transformer T302, and this secondary winding has its output connected to the HT supply via a resistor R314 and is earthed via a capacitor C304. The cathode of tube V302 is directly connected to a capacitor C306*a* connected to a terminal *b*3.

The grid output of the second element of tube V301 is connected via a resistor R310 to an assembly identical to that just described as following upon the resistor R308.

This assembly comprises a resistor R318 whose output is earthed and whose input is connected to resistor R310 and to a capacitor C307. This capacitor C307 is inserted across the input of resistor R318 and that of a resistor R319 whose output is earthed. The input of resistor R319 is connected to a crystal C*x*303 which is in turn connected to the input of a resistor R320 whose output is earthed, and said input of resistor R319 is further connected in the input of a capacitor C309 whose output is both earthed and connected to the input of the primary winding of a transformer T303, said primary winding being bridged across by a resistor R321 and its output being connected to the grid of a tube V303.

The cathode of tube V303 is connected via a resistor R323 to the input of a resistor R324 whose output is earthed, to the input of a potentiometer P302 whose output is also earthed, the input of said capacitor C311 being connected to the HT supply via a resistor R325.

The plate of tube V303 is connected to the secondary winding of transformer T303, and the output of this secondary is connected to the HT supply via a resistor R322 and is earthed via a capacitor C308.

The cathode of tube V303 is connected to a capacitor C310 which is in turn connected to a terminal *d*3.

In the assembly described above, the sine wave generator 1 comprises tube V101 and its auxiliaries and the flip-flop consisting of tube V102 and its auxiliaries, the connection with the blocker 2 being effected at the level of terminals *a*1 and *a*2. This blocker 2 comprises tube V201, while its output, via the terminal *b*2 (FIGURES 1 and 2), is applied to the diode-type mixer 19.

The sine wave generator 3 consists of tube V202 and its auxiliaries and of the first part of tube V203.

The phase-shift of 4 to 15 $\mu$s. is performed between the two parts of tube V203, the second part of this tube constituting an amplifier followed by a clipper formed by the two diodes D202 and D203, while tube V204 acts as an amplifier. The first part of the discriminating and blocking assembly 5 consists of capacitor C207 which terminates at the terminal C2, and this terminal is connected to terminal C3, resistor R302 constituting the second part of the discriminator. Tube V301 and its auxiliaries form the blocking assembly 5. The counting assembly 6 is constituted by the bundle of resistors R309, R311 and R312 together with their auxiliaries. The blocking assembly introducing the delay of 7 to 115 $\mu$s. is constituted by tube V302 and its auxiliaries. Terminal *d*3 is designed for connection to modulator 12.

The counting assembly 8 is constituted by the bundle of resistors R318, R319, R320 and their auxiliaries, and the blocking device introducing the 9 to 215 $\mu$s. delay consists of tube V303 and its auxiliaries. Terminal *b*3 is designed to be connected to modulator 16.

The portion of the apparatus comprising elements 10 to 20 inclusive comprehends only known elements which it is unnecessary to describe and whose functioning principle is well-known to any specialist in the art.

Figure 5:
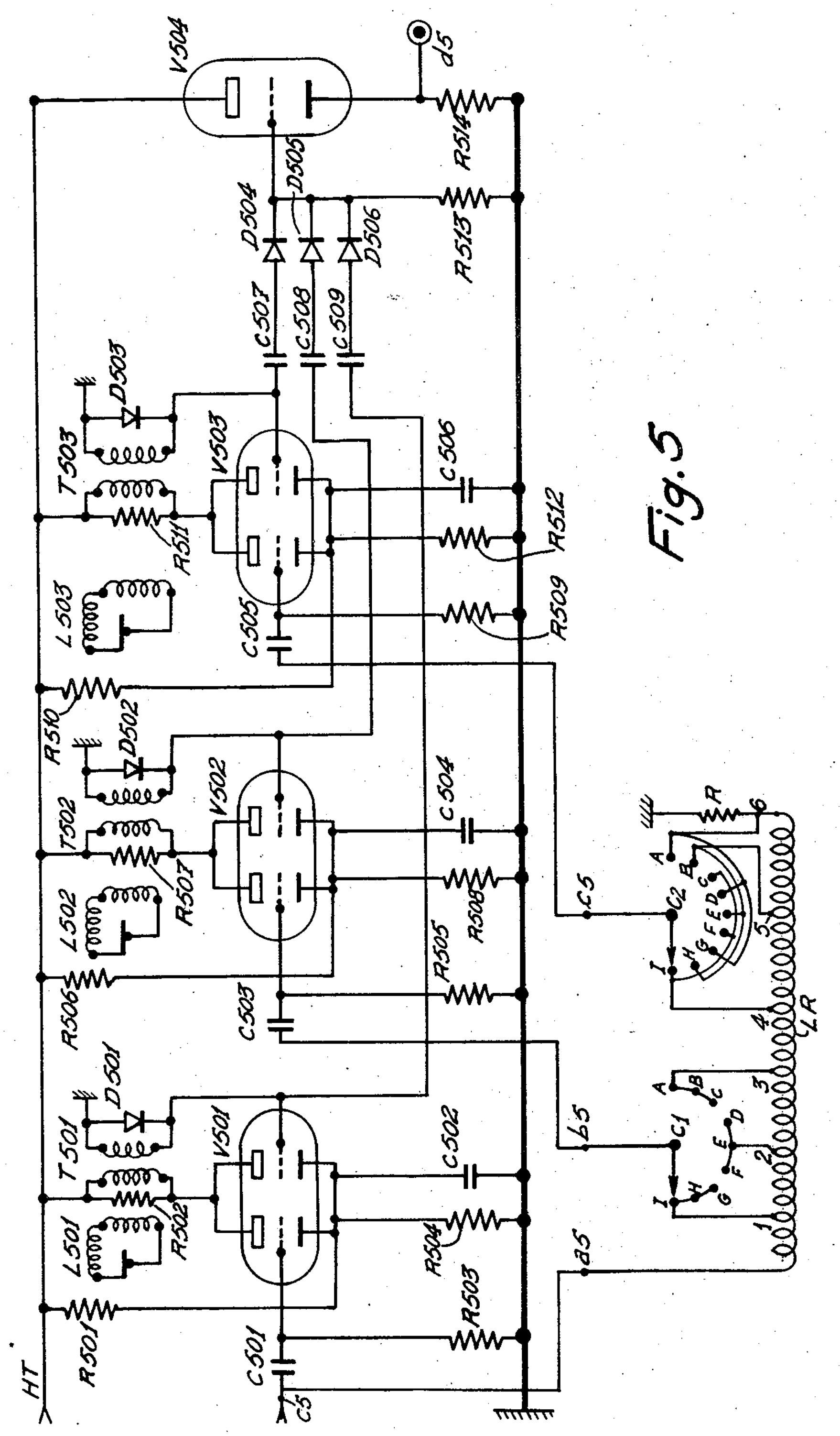
FIG. 5 shows the wiring of the circuits used for the delay lines and for the pre-amplifier feeding the transmission modulator.

In contradistinction, and as may be seen from FIG. 5, the output of blocker 20, in the form of a terminal C4, is connected to the input terminal C5 of blocker 21. This blocker comprises a tube V501 consisting of a double triode, and the grid of the first element thereof is connected to terminal C5 through the medium of a capacitor C501. This terminal C5 is further connected to a terminal *a*5 whose function will be described hereinafter. This grid of the first element of tube V501 is earthed via a resistor R503.

The two cathodes of tube V501 are earthed via a resistor R504 and a capacitor C502 connected in parallel, and the said two cathodes are connected to the HT supply via a resistor R501.

The two plates of tube V501 are connected in parallel to the secondary of a transformer T501, and this secondary is bridged across by a resistor R502 and connected to the HT supply.

The primary winding of said transformer T501 is bridged across by a diode D501, and is earthed and also connected to the grid of the second element of tube V501.

Transformer T501 comprises a tertiary winding which is shorted onto a reflex line L501.

The grid of the second element of tube V501 is connected to a capacitor C509 series-connected to a diode D506, said capacitor C509 being connected to the grid of an output tube V504.

Terminal *a*5 constitutes the input to a delay line LR whose output is earther via a terminal resistor R. This delay line, which is illustrated as a single line on FIG. 5 but in two sections on FIG. 1, is provided with intermediate taps numbered 1 through 6 on FIG. 5. Selector switches are connected to these intermediate taps. A first such selector switch C1 is provided with nine steps lettered A through I and connected up as three successive series of three steps each. Step I, which is electrically integral with steps G and H, is connected to tap 1. Step E, which is electrically integral with steps D and F, is connected to tape 2, while step A, which is similarly electrically integral with steps B and C, is connected to tap 3.

The slider of switch C1 is connected to a terminal *b*5. This terminal *b*5 is connected via a capacitor C503 to the grid of the first element of a double triode V502. This grid is earthed via a resistor R505.

The cathodes of two elements of tube V502 are earthed via a resistor R508 and a capacitor C504 connected in parallel, and the said cathodes are connected to the HT supply via a resistor R506. The plates of the said two elements of tube V502 are connected in parallel to the input of the secondary winding of a transformer T502, and the said secondary winding is bridged across by a resistor R507 while its output is connected to the HT supply.

The grid of the second element of tube V502 is connected to the output of the primary winding of transformer T502, said primary winding being bridged by a diode D502 and having its input earthed.

Transformer T502 has a tertiary winding shorted onto a reflex line L502.

This grid of the second element of tube V502 is connected to a capacitor C508 which is series-connected to a diode D505 connected to the grid of tube V504.

The second switch C2 of delay line LR likewise comprises nine steps, and steps A, D and G are integral from the electrical standpoint and connected to tap 6 of line LR. Steps B, E and H are electrically integral and connected to tap 5, while steps C, F and I are connected to tap 4. The slider of this switch is connected to a terminal C5.

This terminal C5 is connected via a capacitor C505 to the grid of the first element of a double triode V503. This grid is earthed via a resistor R509. The two cathodes of tube V503 are connected in parallel and are earthed via a resistor R512 and a capacitor C560 connected in parallel, and the said cathodes are connected to the HT supply via a resistor R510.

The plates of the two elements of tube V503 are connected in parallel to the secondary of a transformer T503, and this secondary winding is bridged by a resistor R511 and connected to the HT supply. The primary winding of transformer T503 is earthed, is bridged by a diode D503, and is connected to the grid of the second element of tube V503 as well as to a capacitor C507 which is connected to a diode D504, itself connected to the grid of tube V504.

Transformer T503 is provided with a tertiary winding connected to a reflex line L503.

The grid of tube V504 is earthed via a resistor R513 and the plate of this tube is directly connected to the HT supply. The cathode is earthed via a resistor R514 and is connected to an output terminal terminal *d*5.

Referring now to FIGS. 1 and 2, it will be seen that, from the functional point of view, the stage formed by the tube V101, which is connected up as a low-frequency (1000 c.p.s.) sinusoidal oscillator, is biased by the resistor R101 by-passed by capacitor C109. The oscillations are sustained by the three phase-shifting cells R103—C101, R104—C102 and P1—R105—C103 connected across the plate and the control grid in this circuit. The sinusoidal signal is taken from the terminals of the charge resistor R106 and applied to the next stage by capacitor C105. The screen of tube V101 is fed by the HT supply through the resistor R107 by-passed by capacitor C106.

The sinusoidal signal generated by this stage, represented by the generator 1 in FIG. 1, is converted into a square signal by the tube V102 which is wired as a monostable flip-flop. The first element of triode V102 is blocked, in the inoperative state, by the resistor bridge R112 and R108 which biases its grid, its cathode potential being maintained at a positive value by the resistor R113 through which flows the cathode current of the second element of triode tube V102.

At each positive half-wave of the sinusoidal signal transmitted by the capacitor C105 to the control grid of this flip-flop, the first triode of tube V102 delivers current. The drop in potential due to the resistor R109 is transmitted by resistor bridge R110*a* and R114 to the grid of the second element of triode tube V102, and this second element is blocked and maintained so for approximately 200 μs. as the result of the time constant provided by capacitor C107 and resistor R110*a*. At the end of the blocking period, the flip-flop reverts to its initial state until the next positive half-wave is received from the capacitor C105.

The leading edges of the subsequent gates taken from the terminals of resistor R110 are differentiated by the capacitor C108 associated to the resistor R212, and the pulses thereby obtained are applied to tube V201 (FIG. 3) which is likewise wired up as a blocking oscillator.

The first triode element of tube V201, which is used as a synchronizing tube, is maintained blocked by the cathode bridge R201, R213 by-passed by capacitor C211. Each positive pulse applied to its grid unblocks this tube and triggers the blocked oscillator which is constituted by the said tube second triode element in association with the transformer T201 whose secondary winding is connected across the plate and the HT supply and whose primary winding is connected across the grid and the earthing line. This tube element is likewise biased by bridge R201, R213.

The positive pulses emerging from this stage are taken from the terminals of the cathode charge R214 and are transmitted to the next stage by the coupling capacitor C208. The tube V202, which is wired up as a monostable flip-flop, has its first element blocked by the bridge of resistors R203 and R215 connected across the HT supply and the earth line, the corresponding cathode being maintained at a positive potential by the current supplied by the second element of said tube V202 through resistor R216. Each positive pulse transmitted by the conductor C208 unblocks the first element of this tube V202, and the capacitor C202 then becomes negatively charged and blocks the second element of the said tube. The time for which this condition lasts is determined by the time constant provided by capacitor C202 and resistor R206.

The negative gates are then tapped off the charge R204 and transmitted by capacitor C201 to the triode constituting the first element of tube V203. This first element leads to an inoperative condition, its grid being connected to the HT supply via the resistor R208; its cathode is maintained at a fixed potential by virtue of the resistor bridge R208, R217 by-passed by capacitor C212.

When a negative gate is transmitted by capacitor C201, diode D201 becomes conductive and the grid of the first element of tube V203 is thereby brought to earth potential. The corresponding cathode remaining at a fixed potential, the said first element of tube V203 is blocked. The corresponding plate then suddenly rises to the potential of the HT supply and produces, in the tuned circuit constituted by the secondary winding of transformer T202 and the capacitor C203, a free oscillation regime for the duration of the gate emerging from tube V202, following which time-lapse the first section of tube V203 suddenly becomes conductive anew and damps the oscillating circuit which then ceases to be the seat of oscillations. During the time for which it is in oscillation, this circuit is very slightly damped and, while the first section of tube V203 is blocked, furnishes oscillations of virtually constant frequency.

The tuning frequency of this oscillating circuit is determined by the time interval required between two command channels, say 100 μs., so that the frequency of such an oscillating circuit would be adjusted to 10 kc./s. Where two command channels are used, a duration somewhat in excess of that corresponding to two half-waves is necessary and it is preferable to set the duration of the gate furnished by tube V202 at a value slightly in excess of 200 μs.

Since the first command channel is delayed by a time greater than the period of the sine wave, say 115 μs., it will be necessary, to be able to make use of the periodicity of this sine wave, to delay it by a fixed value which would in this case be 15 μs., say (phase shift 4), this delay being provided by a double network of resistors and capacitors consisting of capacitor C204 and resistor R218 and of capacitor C205 and resistor R219 respectively. This sinusoidal voltage is generated by the primary winding of transformer T202 which suitably adapts the impedances and enables the sine-wave phase to be chosen such that the first half-wave is positive. This outphased sinusoidal voltage is amplified by the second section of tube V203 and its associated circuits which constitute a conventional resistor-type amplifier biased by resistor R220 and capacitor C213 and charged by resistor R209.

The amplified signal is transmitted by capacitor C206 and resistor R209*a* to a double limiting-circuit constituted by the diodes D202 and D203 wired in opposition. Such a method of wiring these diodes leads to using the inherent threshold of the diodes as the limiting threshold. The signal is consequently clipped symmetrically and transmitted by capacitor C215 and resistor R221 to an amplifier constituted by the tube V204.

This pentode tube is biased at its cathode by the resistor R222 by-passed by capacitor C214. Its screen is fed from the HT supply via the resistor R211 by-passed by capacitor C216. The amplified signal is taken off the charge resistor R210 and is in the form of a gate and is differentiated by capacitor C207 and resistor R302 (see FIG. 4).

The pulses resulting from this differentiation are applied to tube V301 which is wired as a blocking oscillator and associated to a synchronizing tube.

The complementary part of this stage is similar to that described with reference to tube V201. The cathode of the first triode element is biased by the resistor bridge R301, R304 by-passed by capacitor C301. The plate is connected to the secondary winding of transformer T301, which winding is damped by resistor R303. The second triode element of tube V301 forms an oscillator biased by the resistor bridge R306, R307 by-passed by capacitor C302. The crystal C*x*301 eliminates the negative signals between the grid and the earth line, at the terminals of the primary winding of transformer T301.

This blocking device furnishes a pulse at each positive alternation of the sine wave emerging from the first section of tube V301. In the example chosen, these pulses are delayed by 15, 115 and 215 μs., respectively, relative to the reference signal. These pulses are applied to the similarly constituted counting circuits, in which the accumulation system is constituted by capacitor C303, resistor R311, crystal C*x*302, resistorR312, and the capacitor C305 which furnishes a stepped signal, in which system the capacitor C305 is charged anew each time a pulse is transmitted by capacitor C303 and crystal Cx302, the time constant provided by resistor R312 and capacitor C305 being sufficiently long to ensure that capacitor C305 is but slightly discharged between two successive pulses.

This stepped signal is applied to the grid of tube V302 through the primary winding of transformer T302, the secondary winding of which is connected across the plate of said tube and the HT supply, after the fashion of a conventional blocking device. The cathode of the said tube V302 is maintained at a fixed bias level by the resistor bridge R317, R316, which is connected in parallel with adjustment potentiometer P301 and by-passed by capacitor C306. When the voltage across the terminals of capacitor C305 reaches the value of the biasing voltage, tube V302 is triggered and delivers a short pulse to its cathode charge R315. At the same time, the grid current of tube V302 discharges capacitor C305 very rapidly, so that the counting and accumulating device is ready to operate once more at the next recurrence.

The bias of the cathode of tube V302 determines the number of pulses required to trigger the blocking device, and this bias is adjusted to the required value for each counting system, notably by potentiometer P301.

The pulse taken from the cathode exactly corresponds positionally with the triggering pulse, and the anode filter constituted by resistor R314 and capacitor C304 prevents these pulses from being applied to the HT line.

There are consequently made available at the cathodes of tubes V302 and V303 (the latter being rigorously identical in operation), and consequently also at terminals *d*3 and *b*3, pulses which are delayed by time intervals of fixed values relative to the reference pulse furnished by tube V201 at terminal *b*2, and these delayed pulses key the command channels.

The delayed pulses available at terminals *d*3 and *b*3 are injected into the modulators 12 and 16, and, after modulation and reformation, combined in the diode-type mixer 19 with the reference pulse taken from terminal *b*2.

The pulses emerging from mixer 19 are reformed in blocker 20 prior to injection into the coding assembly.

Once regenerated, these characteristic pulses are applied to the three blocking oscillators constituted by tubes V501, V502 and V503 associated to the delay line LR, along whose length the pulses are tapped with different delays, thereby obtaining the required codes. If required, these codes can be switched through the medium of the selector switches C1 and C2.

The tappings are made at terminals *a*5, *b*5 and *c*5 and the tapped pulses are applied to capacitors C501, C503 and C505.

These three blocking devices are constituted in rigorously identical fashion, and each is biased by a bridge in its cathode circuit. In the case of tube V501, the bridge is constituted by resistors R501 and R504 by-passed by capacitor C502. In the case of tube V502, the bridge is formed by resistors R506, R508 by-passed by capacitor C504, while for tube V503, the bridge is formed by resistors R510 and R512 by-passed by capacitor C510. The grids of the first elements of tube V501, V502 and V503 which operate for synchronization are earthed via the resistor R503, R505 and R509.

The three transformers T501, T502, and T503, with their secondary windings connected across plate and HT supply and their primary windings across grid and earth line, are damped by resistors R502, R507 and R511 respectively, and the three diodes D501, D502 and D503 clip the negative portions of the signals.

The notable feature in the manner of operation of this blocking system resides in the tertiary transformer windings connected to the reflex lines L501, L502 and L503, the purpose of which is as follows:

Were they to be used alone, these blocking devices would produce pulses of a certain duration. In a reflex line, a pulse which is applied to the input is totally reflected and returns to the departure point with a delay equal to twice the inherent delay of the line, the phase being reversed. Such a line coupled to a transformer tertiary winding results in a sudden shorting of the tertiary winding after a time-lapse equal to the time of reflexion, this time-lapse beginning at the start of the pulse. If this time-lag be taken less than the duration of a pulse at the input of the blocking device, then the output pulses have a precisely defined length equal to the time of reflexion in the reflex line under consideration. The shape of the pulses will be determined by the quality of the corresponding transformer.

The coded pulses resulting from the mixing of the signals past diodes D504, D505 and D506 are applied to a cathodyne stage V504, at the terminals of whose charge are available the signals which, via terminal *d*5, are applied to modulator 26 of transmitter 28.

It may be seen, then, that reference pulses supplied by the blocker 2 and triggered externally or internally by the 1 to 1000 c.p.s. oscillator, actually trigger a monostable flip-flop in the generator 3. This flip-flop controls a triode tube to whose plate is connected a circuit oscillating at 10 kc./s. This flip-flop remains in its unstable position for a time somewhat less than 200 $\mu$s., thereby freeing the oscillating circuit for a time-lapse of two complete oscillations plus the beginning of a third oscillation. Damping of this oscillating circuit is sufficiently small to ensure that the pseudo-period does not vary by more than 1 $\mu$s.

The 10 kc./s. sinusoidal pulse then sustains a 15 $\mu$s. phase-shift in the phase-shifter 4, to rearward of the two resistor and capacitor cells, and is then converted into square signals by the discriminating and blocking circuit 5, the point of operation of which is adjusted so that the leading edges of the signals are rigorously in phase with the zero points of the said sinusoidal pulses. The leading edges that are multiples of 100 $\mu$s. are converted into pulses by the discriminating circuit followed by the oscillator of element 5 referred to precedingly.

Through counting circuits 6 and 8 and blocking devices 7 and 9 are produced regenerated pulses delayed by 115 and 215 $\mu$s., respectively, relative to the datum provided by blocker 2, these circuits being arranged so that, for all permissible voltage variations and anticipated atmospheric conditions, the position of these delayed pulses varies by less than 2 $\mu$s. relative to the reference pulse.

The delayed pulses are applied to the command channel modulators 12 and 16 wherein the commands emerging from some control device or from a computer are applied to the cathodyne amplifiers 10 and 14 whose D.C. voltages are superimposed upon the sawtooth signals supplied by the circuit 13.

Flip-flops 11 and 15, to which these signals are applied, generate gates whose cyclic ratios vary in proportion to the D.C. output voltages of cathodynes 10 and 14.

The diode-type modulators 12 and 16, to which are applied the pulses emerging from blockers 7 and 9, and the gates emerging from flip-flops 11 and 15, respectively, will emit pulses only during the positive half-cycles of said gates.

The pulses emerging from modulators 12 and 15 are regenerated by blocking devices 17 and 18 prior to being mixed with the reference pulses in the diode-type mixer 19.

Following a fresh regeneration in blocker 20, the pulses are applied to blocker 21 and also to the coding circuits, with their blockers 22 and 23, from which emerge three basic pulses separated by fixed but adjustable time intervals forming a code.

For indeed the first blocker 20 feeds simultaneously into blocker 21 and into delay line LR, so that blocker 22 is triggered by pulses which emerge from blocker 20 but which are delayed by 1, 2 or 3 $\mu$s. by selector switch C1, depending on the code selected. The fourth blocker 23 is triggered by signals which are supplied by blocker 22 but which are delayed, according to the selected code, by 4.3, 5.3 or 6 $\mu s$. relative to the pulses from the first blocker 21, the pulses passing via delay line LR and selector switch C2.

The pulses from the three blockers 21, 22 and 23 are then mixed in mixer 24 before being applied to cathodyne stage 25.

There is thereby constituted a pulsed code of which the pulses are identically shaped and perfectly calibrated in width.

It is to be clearly understood that many modifications can be made to the specific embodiments described hereinbefore without departing from the scope of the invention. In particular, the frequencies of the basic oscillations and the delays between the pulses may have any value whatsoever other than those given by way of example.

What I claim is:

1. In a coded-pulse radio transmitter in which each basic signal is constituted by at least two pulses separated by a constant time interval forming a preset code, and in which each train of pulses consists of at least three basic signals of which the first is a synchronization signal and the other two are command-channel signals, the command-channel signals being separated from the corresponding synchronization signal by fixed time intervals which key each channel; in combination; a main basic signal generating assembly, an auxiliary sinusoidal oscillation generator connected to said main generating assembly, means for superposing basic signals generated by said main generating assembly and auxiliary sinusoidal oscillations generated by said generator, means for imparting fixed mutual delays to resulting superposed signals relative to reference pulses, a command modulating assembly including at least two modulators individually connected to said means for imparting fixed mutual delays, a mixer connected to said modulators and to said main generating assembly, a coding assembly connected to said mixer, a second mixer connected to said coding assembly, an amplifier, said second mixer being connected to said amplifier, a transmission oscillator, and a transmission modulator connected to said amplifier and to said transmission oscillator.

2. In a coded-pulse radio transmitter as claimed in claim 1 and including a plurality of stages, a regenerating device reforming each pulse interposed between each stage of said transmitter.

3. In a coded-pulse radio transmitter as claimed in claim 1, a phase shifter connected to said auxiliary generator, at least two counting systems connected in parallel to said phase shifter, said counting systems having different accumulation times, each of said counting systems being connected to one of said modulators in said command modulating assembly.

4. In a code-pulse radio transmitter as claimed in claim 1, said coding assembly comprising, in combination, a delay-line including at least three output taps, one of which is located at the head of said line, the other two which are located downwardly thereof comprising multiple taps, a pair of switching selectors including a plurality of contacts, said multiple taps being connected to the contacts of said pair of switching selectors, said head tap and said selectors being connected in parallel to said second mixer.

5. In a code-pulse radio transmitter, as claimed in claim 4, regenerating devices connected to said output taps of said delay-line and in said regenerating devices, output transformers each including a tertiary winding and a reflex line, each said tertiary winding being short-circuited by the corresponding reflex line, whereby the outgoing pulses are provided with an accurately predetermined duration.

No references cited.